Nov. 14, 1944.        L. H. BROWN        2,362,611
WINDSHIELD CONSTRUCTION
Filed Sept. 23, 1942
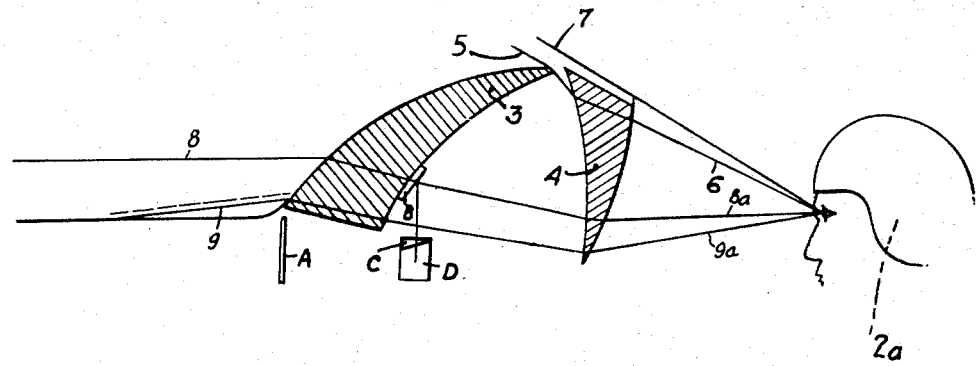
Leo H. Brown INVENTOR.
BY Mock & Blum
ATTORNEYS Patented Nov. 14, 1944

2,362,611

UNITED STATES PATENT OFFICE 2,362,611

WINDSHIELD CONSTRUCTION

Leo H. Brown, Glenville, Conn.

Application September 23, 1942, Serial No. 459,373

3 Claims. (Cl. 88—1)

My invention relates to a new and improved windshield construction for airplanes, tanks and vehicles of all kinds, and for use in other locations.

One of the objects of my invention is to provide a windshield construction which will be more compact than the present windshield construction, thus reducing wind resistance.

Another object of my invention is to provide greater safety for the pilot by locating the head of the pilot in a lower position than in the conventional type of windshield. In addition, the pilot can more conveniently read the instrument board in said lower position.

Another object of my invention is to largely eliminate optical distortion and to provide the required ease and range of forward view, in said lower position. This is very important in landing the plane.

Other objects of my invention will be stated in the annexed description and drawing which illustrate a preferred embodiment thereof.

According to my invention, the conventional windshield is replaced by two prismatic members 3 and 4. The prismatic member 3 can be made of glass or other material which is not bulletproof, such as "Lucite." The name "Lucite" designates an acrylic ester resin. Member 3 may be bulletproof, in addition to, or instead of, member 4. The prismatic member 4 is made of bulletproof glass or other bulletproof transparent material. The thick end of each prismatic member is aligned with the thin end of the other prismatic member. This substantially corrects chromatic aberration, so that the members 3 and 4 need not be achromatic. In the annexed drawing, which is made according to scale, the prismatic member 3 and 4 are shown as having aligned curved faces, each said curved face being a part of a sphere. However, said prismatic members 3 and 4 could have planar faces. These prismatic members are longitudinally aligned. The thin end of member 3 is longitudinally aligned with the thick end of member 4, and the thick end of member 3 is aligned with the thin end of member 4. The beam of light 7 directly reaches the eye of the pilot at observation post 2a. The beam of light 5 is refracted in the direction 6. The beams 8 and 9 are finally refracted in the directions 8a and 9a. A wide field of vision is thus provided, with additional safety.

The reference letter A designates an optional shield which is made of metal or other bulletproof material and which extends below the prismatic members. D is an electrically lighted reflector sight of the conventional type, which is used in combination with the conventional semi-transparent reflector B, which transmits and also reflects light. The prism C corrects the achromatic aberration of prismatic member 4.

In a working embodiment, the vertical distance between the top and bottom levels of the improved windshield is approximately one-half the corresponding vertical distance between the top and bottom levels of the conventional windshield.

While the invention is illustrated in connection with an airplane, it may also be used in connection with tanks and vehicles of various kinds.

Likewise, the device is useful for any purpose where it is desirable to provide a compact viewing device, especially when it is necessary to protect the head of the observer.

The members 3 and 4 are generally designated as longitudinally aligned prismatic members, which refract the light to an observation point which is at sufficient distance below the top of the innermost prism so that the top of the head of the observer is located below the top of said innermost prism. The invention is not restricted to the use of two prisms, although two prisms are sufficient for practical purposes.

The average distance between the eyes of a pilot and the top of the head of the pilot is 4–6 inches. Therefore, the observation point should be at least 4–6 inches below the top of the inner prism 4.

The drawing is substantially to scale and reference is made thereto for further details.

In this specific embodiment, the top point of the prismatic member 4 is substantially at the same level as the top point of the prismatic member 3. The invention is not limited to this arrangement. Likewise, the member 3 may be made of bulletproof glass, instead of the member 4, if this is desired. Generally speaking, the observation post is located at least 4–6 inches below the top of the highest prismatic member.

In the drawing, the device is shown in the position in which the longitudinal axis of the field of vision is horizontal. The incidents rays 8 and 9 are substantially horizontal. The prismatic members 3 and 4 are inclined to each other, so that the thin bottom end of member 4 is spaced longitudinally from the thick bottom end of member 3. The rays which are refracted through the inner prismatic member 4, are inclined in opposite directions, to the observation post at which the eyes of the observer are located. The respective concave spherical faces of the members 3 and 4 are in direct longitudinal succession.

Said members 3 and 4 are of sufficient height, and they are sufficiently in longitudinal alignment, to serve as longitudinally spaced windshield members.

I have shown a preferred embodiment of my invention, but it is clear that numerous changes and omissions can be made without departing from its spirit.

I claim:

1. A windshield for use in front of the location of an observation post, said windshield comprising longitudinally spaced and longitudinally alined respective prismatic members of sufficient size to shield the head of an observer which is located at the location of said observation post, said prismatic members having their respective thin and thick ends longitudinally alined so that a light beam which is refracted through a thin end of one prismatic member is also refracted through the thick end of the other prismatic member, the top of the highest prismatic member being located at least four inches above the location of said observation post.

2. A windshield for use in front of the location of an observation post, said windshield comprising longitudinally spaced and longitudinally alined respective prismatic members of sufficient size to shield the head of an observer which is located at the location of said observation post, said prismatic members having their respective thin and thick ends longitudinally alined so that a light beam which is refracted through a thin end of one prismatic member is also refracted through the thick end of the other prismatic member, the top of the highest prismatic member being located at least four inches above the location of said observation post, the prismatic member which is next adjacent the location of said observation post having its thin end at the bottom thereof.

3. A windshield for use in front of the location of an observation post, said windshield comprising longitudinally spaced and longitudinally alined respective prismatic members of sufficient size to shield the head of an observer which is located at the location of said observation post, said prismatic members having their respective thin and thick ends longitudinally alined so that a light beam which is refracted through a thin end of one prismatic member is also refracted through the thick end of the other prismatic member, the top of the highest prismatic member being located at least four inches above the location of said observation post, the prismatic member which is next adjacent the location of said observation post having its thin end at the bottom thereof, the longitudinal spacing between the tops of said prismatic members being less than the longitudinal spacing between the bottoms thereof.

LEO H. BROWN.